United States Patent [19]

Clay et al.

[11] Patent Number: 5,459,850
[45] Date of Patent: Oct. 17, 1995

[54] FLASH SOLID STATE DRIVE THAT EMULATES A DISK DRIVE AND STORES VARIABLE LENGTH AND FIXED LENTH DATA BLOCKS

[75] Inventors: Donald W. Clay, Louisville; Steven A. Anderson, Loveland, both of Colo.

[73] Assignee: Conner Peripherals, Inc., San Jose, Calif.

[21] Appl. No.: 19,860

[22] Filed: Feb. 19, 1993

[51] Int. Cl.[6] .............................. G06F 12/06; G06F 12/04
[52] U.S. Cl. ...................................... 395/497.02; 371/37.1; 364/260.6; 364/260.7; 364/245.1; 364/DIG. 1; 395/442; 395/500
[58] Field of Search ......................... 395/425; 364/260.6, 364/260.7, 200 MS, 900 MS, 245.1; 371/37.1

[56] References Cited

U.S. PATENT DOCUMENTS

| | | | |
|---|---|---|---|
| 4,593,267 | 6/1986 | Kuroda et al. | 340/347 |
| 4,675,809 | 6/1987 | Omoda et al. | 395/400 |
| 4,947,319 | 8/1990 | Bozman | 395/700 |
| 4,958,315 | 9/1990 | Balch | 395/425 |
| 5,034,914 | 7/1991 | Osterlund | 395/425 |
| 5,070,474 | 12/1991 | Tuma et al. | 395/500 |
| 5,131,089 | 7/1992 | Cole | 395/500 |
| 5,166,686 | 11/1992 | Sugiyama | 341/155 |
| 5,170,263 | 12/1992 | Hisatake et al. | 358/426 |
| 5,206,939 | 4/1993 | Yanai et al. | 395/400 |
| 5,218,691 | 6/1993 | Tuma et al. | 395/500 |
| 5,237,460 | 8/1993 | Miller et al. | 360/8 |
| 5,237,675 | 8/1993 | Hannon, Jr. | 395/425 |
| 5,274,772 | 12/1993 | Dunn et al. | 395/275 |
| 5,285,327 | 2/1994 | Hetzler | 360/48 |
| 5,291,584 | 3/1994 | Challa et al. | 395/500 |
| 5,293,388 | 3/1994 | Monroe et al. | 371/37.1 |
| 5,293,565 | 3/1994 | Jaquette et al. | 369/32 |
| 5,301,304 | 4/1994 | Menon | 395/500 |
| 5,335,328 | 8/1994 | Dunn et al. | 395/275 |

OTHER PUBLICATIONS

"Flash Memory Challenges Disk Drives" by Gary Legg, EDN, Feb. 18, 1993.

*Primary Examiner*—Glenn Gossage
*Assistant Examiner*—Frank J. Asta
*Attorney, Agent, or Firm*—Fliesler, Dubb, Meyer & Lovejoy

[57] ABSTRACT

A flash solid state drive, having a flash solid state memory compatible with ATA/IDE Interface standards to be connected to a host for storing or retrieving sectors of data, where each sector contains 512 bytes of data, each sector is addressed by a cylinder, head and sector number CHS. The host provides, for a read or write operation, the number of sectors to be stored or retrieved, the CHS for each sector to be stored or retrieved and the data for the sectors to be stored. The solid state memory has stored therein a header for each CHS address that can be issued by the host, the header having indicia identifying the data block and indicating where the data for the data block is stored in the solid state memory. The flash solid state device comprises a translator means for translating the CHS address into a logic sector number LSN for identifying sectors in the flash solid state drive and a controller for converting sectors received from the host into variable length sectors to be stored in the flash solid state memory.

9 Claims, 9 Drawing Sheets

FLASH SOLID STATE DRIVE THAT EMULATES A DISK DRIVE AND STORES VARIABLE LENGTH AND FIXED LENTH DATA BLOCKS

BACKGROUND OF THE INVENTION

1. Field of the Invention

The present invention relates to digital data storage systems in general and, in particular, to storage systems employing flash solid state memory devices as the storage media. More particularly still, the invention relates to a flash solid state memory system that emulates magnetic disk drives.

2. Description of the Related Art

Magnetic disk drives have been widely accepted in the computer industry and are used for storing large amounts of data. Over the years, magnetic disk drives have decreased in size while increasing in operational speed and in the amount of data that can be stored on the magnetic media. Magnetic disk drives have associated with them a seek latency time which is associated with the time necessary to move the desired transducer to the desired track or cylinder on the magnetic media for the purpose of recovering or writing data to and from the magnetic media. In addition, there is a rotational latency associated with waiting for the desired data sector to pass underneath the transducer once the transducer is located on the desired track. Magnetic disk drives also have the associated problems of relying on mechanical hardware for locating the transducer at a specific location with regards to the magnetic media and for maintaining the rotational speed of the magnetic media at some constant value. The mechanical hardware is affected by the normal wear and tear associated with mechanical devices. Further, magnetic disk drives have employed various track following servo systems for maintaining the transducer on a desired track once the transducer reaches that desired track. Finally, the magnetic disk drive tracks are divided into a fixed number of sectors where each sector stores a fixed number of data bytes. As a rule, magnetic disk drive systems will write a complete sector each time a sector is written. Where the data is less than a full sector the data is padded with zeros to fill up the sector. This is to say that if the sector length is 512 bytes, whenever a sector is written 512 bytes of data will be written into that sector. The requirements of writing a full sector every time a sector is written means that a substantial portion of the magnetic surface may be allocated to contain filler data rather than useful data. Finally, it can readily be realized that the data would also be recovered from the magnetic disk drive in sector lengths and, therefore, a full sector must be read from the disk regardless of the actual amount of useful data that was recorded in that sector.

With the advent of solid state memories, attempts have been made to emulate the magnetic disk drives by use of solid state memories in place of the magnetic media. Examples of such emulations are found in U.S. Pat. No. 4,642,759 entitled "Bubble Memory Disk Emulation System" and U.S. Pat. No. 5,131,089 entitled "Solid State Disk Drive Emulation".

The ideal system would use a solid state memory that is nonvolatile such as the above-referenced bubble memory or the solid state memory with its own power supply to maintain the stored data even though power is turned off to the drive. However, each of these solid state memories each have their own advantages and disadvantages which must be weighed in selecting which solid state memory should and could be used in a specific design.

To have a solid state drive emulate a magnetic disk drive, the solid state storage media must be transparent to the host. Ideally, the solid state drive would accept the same commands and data formats as the magnetic disk drive such that no change in programming or system configuration need be done within the host. A disadvantage associated with most solid state memories is the time necessary to write into the memory. The slow write speed is a major reason why the solid state drives emulating magnetic disk drives have not been more widely accepted and marketed within the industry.

SUMMARY OF THE INVENTION

Accordingly, it is an object of the invention to provide a flash solid state drive which emulates a magnetic disk drive and is transparent to the host system.

Another object of the invention to have a flash solid state drive with improved speed for writing and reading data to and from the flash memory array.

Another object of the invention is to have the flash solid state drive include means for compressing data on a sector basis such that sectors of variable lengths are written into and read from the flash memory array and where the compression is transparent to the host system.

Still another object of the invention to have a flash solid state drive which dynamically allocates space in the flash memory array such that sequential sectors to be written need not be sequentially located in the flash memory array.

Briefly, the flash solid state drive is 100% hardware and software compatible with ATA/IDE Interface standards and supports all mandatory AT-Attachment standard commands. The flash solid state drive includes means for translating the cylinder, head and sector address received from the host into a logical sector number LSN. A sector translation table is maintained for providing the physical address in the flash memory for the header associated with each logical sector number. The flash memory is comprised of a plurality of flash memory chips arranged to form a flash memory array where two flash chips are paired together to form flash chip pairs which the drive treats as a single addressable unit. A buffer is provided to receive data from the host and from the flash memory. Data received from the host to be stored in the flash memory may first be passed through a data compression unit and stored as compressed data in the buffer. Data is written from the buffer into the flash memory as data word where a data word is made up of two bytes of data. The 16 bits of data in a data word are written in parallel into the flash memory. Further, the received data, if compressed, is also passed through a cycle redundancy code CRC generator and the CRC data is appended to the end of the compressed data stored in the buffer. The stored data and the CRC data, if the data was compressed, is passed through an ECC generator before being stored in flash memory. The generated ECC data is stored in the flash memory so as to be appended to the end of the data and CRC data, if any. Data is read from the flash memory as a data word (2 bytes at a time) and stored in the memory buffer as single bytes of data. A read sequencer between the flash memory and the buffer changes the data words in two sequential data bytes for storage in the buffer. The data from the read sequencer is passed through an ECC detector to ascertain if an error has occurred. If an error was sensed the drive will try a reread operation at a slower speed. If the error is not corrected by the reread operation, then a ECC correction is attempted to recover from the error. If the error was not corrected, the host is notified. If the data was not compressed, the data is channeled from the buffer directly to the host. If the data was compressed, the compressed data is routed through a decompression unit and the decompressed data is channeled to the host. The uncompressed data is also routed through a CRC checker and if an error is detected the drive will notify the host that the channeled data contained an error. The flash memory is initialized to store a header for each LSN where the number of LSNs equal the number of sectors that would have been used in the magnetic disk drive being emulated. A new header is written for a sector each time the sector is written into the flash memory and the old header associated with the same sector is marked as dirty or invalid. Each flash memory chip pair is broken down into blocks where a block is the smallest area that can be erased. Means are provided for ascertaining the usage of each block to obtain uniform usage of blocks throughout the memory array. Blocks are designated as bad if the block has a history of unrecoverable errors being generated from data read from that block. A bad block table is maintained and updated in a flash ROM associated with the microprocessor controlling the operation of the drive.

An advantage of the flash solid state drive is the increase in read and write speed to and from the flash memory obtained by the parallel writing and reading of two bytes of data.

Another advantage of the flash solid state drive is the increased efficiency obtained by compressing sector data such that variable sector lengths are stored in the flash memory.

Another advantage is that the flash solid state drive is not subject to the seek and rotational latencies associated with magnetic disk drives and are more reliable in that flash solid state drives do not have any mechanical components that can wear and fail.

Another advantage of the flash solid state drive is that the flash memory is transparent to the host so as not to require any reprogramming of the host operating system or changes to physical structure of the host thereby allow the flash solid state drive to completely emulate the magnetic disk drive previously used by the host.

BRIEF DESCRIPTION OF THE DRAWINGS

The invention will be described with respect to the particular embodiments thereof and references will be made to the drawings, in which.

DESCRIPTION OF THE PREFERRED EMBODIMENTS SYSTEM ARCHITECTURE

Figure 1:
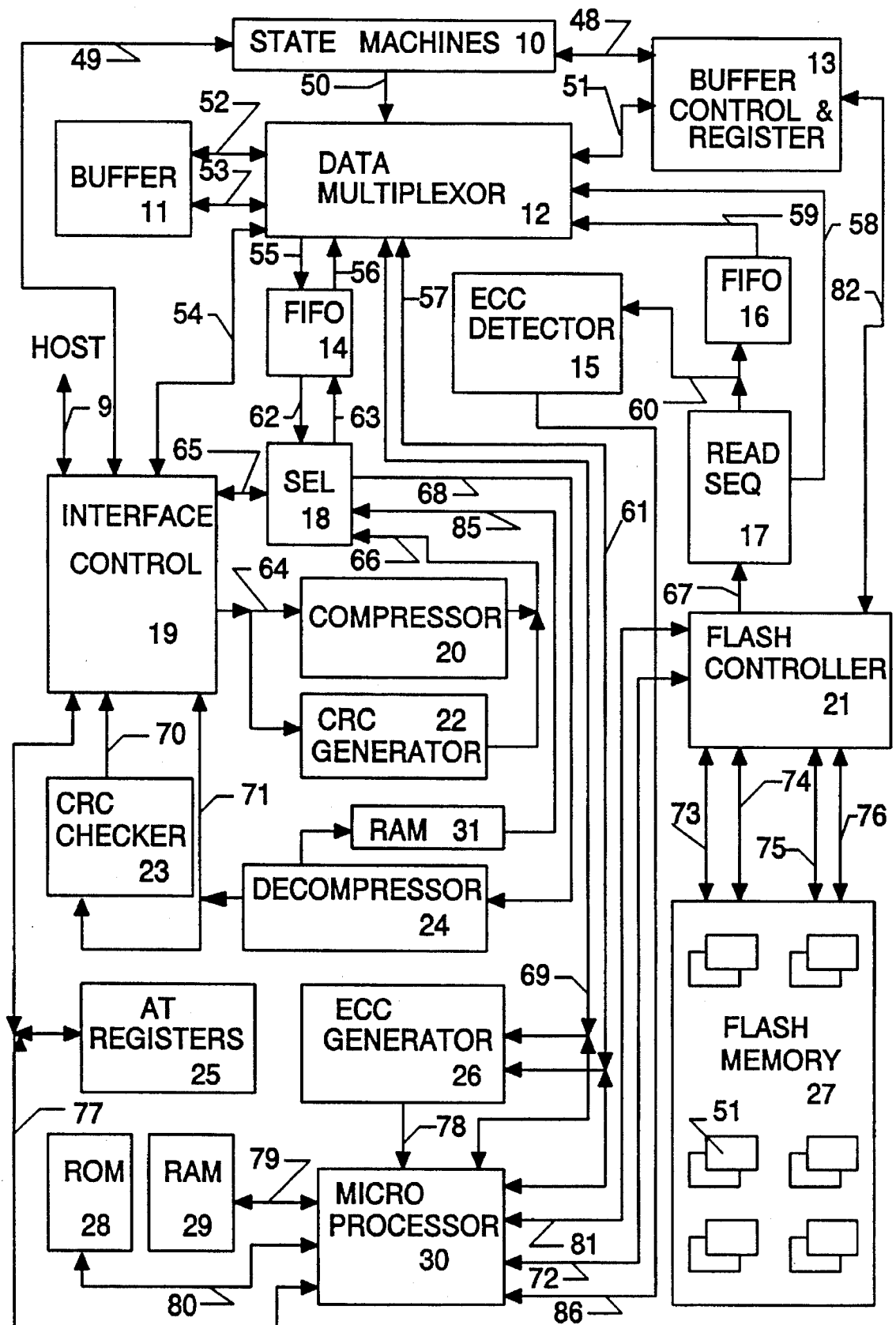
FIG. 1 is a logic diagram of the flash solid state drive.

FIG. 1 is a logic diagram showing the components of the flash solid state drive. The flash solid state drive is 100% hardware and software compatible with ATA/IDE Interface standards and will support all mandatory AT-Attachment standard commands.

Flash memory 27 is comprised of thirty Intel 28F008 flash chips where the chip data size is 8 Mb and 8 bits of data are simultaneously written into or read from the flash chip. Two flash chips are paired together and addressed at the same time such that 16 bits may be written or read simultaneously into or from the flash memory. To accomplish this flash controller 21 is dual ported so as to provide both address and data to each flash chip of a chip pair by means of lines 73 through 76. The flash solid state drive is controlled by microprocessor 30 in conjunction with an operating program stored in ROM 28. Microprocessor 30 is also connected to RAM 29 to allow the dynamic storing of data necessary for controlling the operation of the drive. Microprocessor 30 is connected to AT registers 25, to interface control circuitry 19, to flash control 21, to data multiplexer 12, to ECC generator 26, to buffer control and registers 13 and to ECC detector 15.

For a write operation, data for a sector is received from the host on bus 9 to interface control 19. If the sector data is to be compressed, the sector data is transferred via line 64 to compressor 20 for data compression and through CRC generator 22 for generating CRC data. Data compressor 20 is a LEMPAL/ZIV type data compressor. The compressed sector data, after being compressed, is stored in buffer 11. After the compressed sector data has been stored in buffer 11 the CRC data byte is stored in buffer 11 and made part of the data associated with the sector being stored.

If the sector data was not to be compressed, then the sector data would leave interface control 19 on line 65 and pass directly through selector 18, FIFO 14 and data multiplexer 12 into buffer 11. State machines 10 contains a write state machine which controls the sequence of operations during a write operation. Once the data for the sector, either compressed or uncompressed, has been stored in buffer 11, the write state machine will then transfer the sector data from data multiplexer 12 to microprocessor 30. Microprocessor 30 act as a dual port microprocessor where the ports are connected to data multiplexer 12 by means of buses 57 and 69. When sector data is transferred from buffer 11 to microprocessor 30 the sector data is also passed through ECC generator 26 to generate the ECC data. The ECC data is also provided to microprocessor 30. Microprocessor 30 transfers the sector data and ECC data as data words, where each data word consists of two bytes of data,to flash controller 21. Microprocessor 30 performs the task of taking two sequential bytes of sector data from buffer 11 or ECC data and forming data words for flash controller 21. Flash controller 21 then writes the data word into the flash memory 27.

During a read operation, the read command is received from the host on bus 9 by interface control 19. State machine 10 includes a read state machine which controls the sequence of operation during the read procedure. The data is read from flash memory 27 by flash controller 21 as data word format. Read sequencer 17 receives the data word and provides sequentially each of the two bytes of data making up the received data word to speed matching buffer FIFO 16. Read sequencer 17 also routes the data bytes to ECC detector 15 for the detection of an error in the read data. The output of FIFO 16 is routed through multiplexer 12 to buffer 11. When the data for a sector has been stored in buffer 11 and no data error was detected by ECC detector 15, the sector data is then directed from buffer 11 through data multiplexer 12 and speed matching buffer FIFO 14 to selector 18. If the sector data was compressed, then the sector data is routed from selector 18 through decompressor 24. The decompressed sector data from decompressor 24 is routed to CRC checker 23 and to interface control 19 for transmission to the host. If CRC checker 23 detects a CRC error, a flag is raised to the host indicating that an error exists in the sector data that was transmitted for that sector. If the read sector data was not compressed, selector 18 will route the sector data via line 65 to interface control 19 which will then route the data to the host via bus 9.

State machines 10 also contains a between sector state machine for updating the task file registers and a byte count state machine for maintaining of the number of bytes of data transfer during a read or write operation.

AT registers 25 and buffer control registers 13 are used to control the sequence of operation in conjunction with the microprocessor performing the operation program as stored in ROM 28 and the operation of the varies state machines. Buffer control and registers 13 include a tie breaking state machine for to resolve conflicts in the data multiplexer 12 for access to buffer 11 and a buffer signal state machine for controlling the reading and writing of data into and out of buffer 11.

The function of and description of the AT registers 25 and buffer registers 13 are as follows:

AT REGISTERS

TASK FILE ERROR REGISTER

This register is the error indicating register to the Host. It has bit significance except at power on or during the diagnostic command. It is a read only register to the Host.

bit 7—Bad Block
bit 6—ECC Data Check
bit 4—ID Not Found
bit 2—Aborted Command
bit 1—Track 0 Not Found
bit 0—Address Mark Not Found

TASK FILE PRECOMP REGISTER

This register is a write only register to the Host. It was previously used to indicate at what cylinder to begin precompensation. It is used for other commands at this point in time.

TASK FILE COUNT REGISTER

The register is used by the Host to indicate how many sectors are to be transferred on a read or write command.

TASK FILE SECTOR REGISTER

TASK FILE SDH REGISTER bit 4—Drive address
bit 3—Head bit 8
bit 2—Head bit 4
bit 1—Head bit 2
bit 0—Head bit 1

TASK FILE CYLINDER LOW REGISTER

This register and the following register contain the cylinder requested by the Host.

TASK FILE CYLINDER HIGH REGISTER

COMMAND REGISTER

This register is used by the Host to communicate the desired command. When either the Host or the drive write this register, the drive will become busy. When the drive is busy, only the drive may write the task file. When the drive is not busy, only the Host may write the Task File unless the drive writes 0D bit 3 to enable the microprocessor access to the Task File registers.

SECTOR CONFIGURATION REGISTER

This is a 8 bit register used to determine the sector wrap point for the Host values.

HEAD CONFIGURATION REGISTERS

This is a 4 bit register used to determine the head wrap point for the Host values.

bit 3—Head bit 8
bit 2—Head bit 4
bit 1—Head bit 2
bit 0—Head bit 1

DIGITAL ADDRESS REGISTER

This register is the same as that read at 3F7 by the Host with the exception that bit 7 is a one instead of tristate as it is to the interface.

bit 7—Always 1
bit 6—Always 1
bit 5—Head bit 3~
bit 4—Head bit 2~
bit 3—Head bit 1~
bit 2—Head bit 0~
bit 1—Drive 1~
bit 0—Drive 0~

AT CONTROL REGISTER

This register contains status bits for use by the microcode. It is read only.

7—Sector>maximum logical sector

This bit contains the result of a comparison of the Task File Sector Number register and the Sector configuration register.

bit 6—Head>maximum logical head

This bit contains the result of a comparison of the Task File SDH register head value and the Head configuration register.

bit 5—Count equal to 0

This bit is 1 when the Task File Count Register is equal to 0.

bit 4—ECC Error

This bit is 1 when an ECC error is detected. The ECC is should be reset by toggling AT Res 1 in the Microprocessor's reset register before continuing.

bit 3—Byte count equal to 0

This bit is one when the transfer count register that counts the number of bytes to be transferred on the interface is=0.

bit 2—IOR & IOW equal to 0

This bit is for use in PCMCIA interfaces. It is 1 when both

IOR &IOW are active low at the same time.

bit 1—Task file update state 1

This bit and bit 0 contain the status of the task file update state machine. It is triggered by the read or write state machines and normally should not be able to be seen changing. It should always be in state 00.

bit 0—Task file update state 0

TASK FILE STATUS REGISTER

This register which is a read/write register used to access the Task File register which provides a summary status of the drive. All bits are read/write.

bit 7—Busy bit 6—Ready bit 5—Write Fault bit 4—Seek Complete bit 3—Data Request bit 2—Corrected data bit 1—Index bit 0—Error bit

INTERFACE CONTROL REGISTER bit 7—Host PDIAG Out

This bit, when set to 1, drives the Host PDIAG signal active low. It is bit settable.

bit 6—LED/Drive Slave Present

This bit, when set to 0, drives the DASP signal low to the interface.

bit 5—Processor Host Interrupt Enable

This bit may be set to 1 to force the Host interrupt to be enabled. It should be reset to allow the Host to enable or disable the drive's interrupt.

bit 4—OK to continue

This bit is used by the processor to allow a multiple sector read or write to continue. Normally it should be set to 1 at initialization. If sector automation is to be inhibited, this bit should be set to zero. Then, between sectors, the bit pulse, CONTINUE R/W 0E, bit 3, is pulsed to continue the R/W.

bit 3—Enable microprocessor access to the Task File Registers.

This bit is used by the processor to enable it to access the Task File even when the drive is not busy. Normally, this bit is not ever used.

bit 2—INDEX.

This bit is routed to the status register to simulate the index of a drive. For the flash drive it should not be needed.

bit 1—C-/D.

The address bit of the drive. It is set to 0 for drive C or 0 and to 1 for drive 1 or D. This bit is used to route status and is compared to the bit in the SDH register to determine the addressed drive.

bit 0—Slave Present.

This bit is used to indicate that a second drive is present. It is set during a reset sequence when dual drive is detected. It is used to route status because if the second drive is not present, the master drive, drive 0, is responsible to return 00 for status. Setting this bit allows the hardware to return this status.

BIT PULSES REGISTER

This register is setup to allow bit operations to be done. When it is read, it always returns FFh. To pulse any of these bits, a zero is written.

bit 7—Set Host IRQ.

This bit sets the Host interrupt which is gated by the Host interrupt enable.

bit 6—Reset Long.

This reset is used to reset the Long bit, set by the Host when it does either a read or write long.

bit 5—Reset Read/Write Mode.

This bit resets both read and write modes and the Data Request bit.

bit 4—Set Read Mode.

This bit sets read mode. It is the only bit required to kick off a read operation if all other initialization has been accomplished.

bit 3—Continue R/W.

This bit is used when the sector automation is disabled, register 0D bit 4 set to 0. to allow the next sector to begin.

bit 2—Increment Block Release

This is the drive side pulse used to increment the Sectors Available Register. 35 on a read and to decrement it on a write.

bit 1—Increment Transfer Release.

This is the Host side pulse used to decrement the Sectors Available Register. 35 on a read and to increment it on a write.

bit 0—Set Write Mode.

Used to set Write Mode. This bit is used by the microprocessor to start any non-autowrite write operation.

INTERFACE BITS REGISTER

This is a collection of bits that are useful for interface operation.

bit 7—Host IRQ.

This is the Host IRQ bit just before it goes to the output drivers.

bit 6—Host Interrupt Enable.

This is the Host Interrupt Enable bit just before it goes to the output drivers.

bit 5—Host PDIAG In.

This bit comes from the PDIAG line just on the input side of the Host input receivers.

bit 4—Long

This bit is the long bit set by the Host when it does either a read or write long operation.

bit 3—HIO16

This is the HIO16 line just before it goes to the Host interface.

bit 2—Write Mode

The Write mode latch.

bit 1—Read Mode

The Read Mode latch.

bit 0—Drive Slave Present In.

The drive slave present line at the input receiver lines.

ECC 1 GENERATION 4

This register and the following three registers are the registers where the ECC Generator 1 result is stored. To produce the correct ECC value, the registers should be initialized to F0, 0F, 00, FF respectively before the data is read by the microprocessor from Port 1 of the Buffer. It is possible to interrupt the ECC generation by saving away the current contents of the registers and then restoring them to continue.

ECC 1 GENERATION 3

ECC 1 GENERATION 2

ECC 1 GENERATION 1

ECC 2 GENERATION 4

This register and the following three registers are the registers where the ECC Generator 2 result is stored. To produce the correct ECC value, the registers should be initialized to F0, 0F, 00, FF respectively before the data is read by the microprocessor from Port 1 of the Buffer. It is possible to interrupt the ECC generation by saving away the current contents of the registers and then restoring them to continue.

ECC 2 GENERATION 3

ECC 2 GENERATION 2

ECC 2 GENERATION 1

ECC DETECTION 4

The ECC Detection automatically loads the polynomial into this register and the following 3 registers and then calculates the ECC on the read data. The hardware then automatically triggers the compare on the ECC bytes read at the end of the sector.

ECC DETECTION 3

ECC DETECTION 2

ECC DETECTION 1

TRANSFER LENGTH LOW REGISTER

This register and the following one, control the length of each sector transfer. It is normally set only at power on time. This register is used to measure the length of the sector transfer.

TRANSFER LENGTH HIGH REGISTER

22—BIT PULSES 2

This register is setup to allow bit operations to be done. When it is read, it always returns FFh. To pulse any of these bits, a zero is written.

bit 7—Last Transfer.

This bit is used to force the AT automation to end the transfer at the end of the current sector or block.

bit 6—Start Compressor.

This bit provides the capability to start the compressor in the non-autowrite case. One of its principle other uses will be to start the compressor to rewrite a sector that has expanded back to the buffer as a non-compressed sector.

AT DATA 1 REGISTER bit 7—Disable compression

This bit disables the compression circuitry when set. When compression is disabled, a sectors are transferred as 512 byte sectors.

bit 6—PIO Mode

When this bit is set, Host data transfers are done in PIO mode. This bit enables the IO16 circuitry when set.

bit 5—EISA DMA Mode

This bit enables EISA DMA Mode. It controls how the Host Interface to drive handshaking is done on read and write DMA commands. When this bit is set DMA transfers are accomplished with Host DMA Request and Host DMA Acknowledge remaining active for the entire transfer although the Host will drop Host DMA Acknowledge when it does a refresh cycle.

bit 4—ISA DMA Mode

This bit enables ISA DMAMode. It controls how the Host Interface to drive handshaking is done on read and write DMA commands. When this bit is set DMAtransfers are accomplished with Host DMARequest and Host DMA Acknowledge toggling on every word transfer.

bit 3—Multiple Mode

This bit is set when the Host issues a Set Multiple Command, C6h. It enables multiple operations in the ASIC hardware.

bit 2—Host DMA Enable

This bit is only used by the microprocessor when connected to a Compaq computer that requires this signal to initiate a DMA read/write transfer.

bit 1—Disable Autowrites

When set this bit, autowrites are disabled. Disabling autowrites requires that the microprocessor set Write Mode, by clearing register 0E, bit 4.

bit 0—Disable CRC

When set this bit disables the CRC check. It also disables writing the CRC bit.

CRC REGISTER

This register contains the CRC byte. It is valid at the end of a sector until the start of the next sector.

BLOCK SIZE REGISTER

This register contains the number of sectors in a block on a read/write multiple. It is set by the microprocessor when the Host issues a C6h, Set Multiple Command. It is used by the AT ASIC circuitry to control the number of sectors to be transferred under a single DRQ.

ECC LENGTH REGISTER

This register controls the length of the transfer of the ECC bytes during a long read or write command. It is usually only set during reset, but may also be modified by the Host, Set ECC Length. This register is used by the AT circuitry of the ASIC.

BYTE COUNT LOW REGISTER

This register and the following register are the actual transfer length registers. They are loaded by the AT circuitry of the ASIC with either the contents of Transfer Length Register or the ECC Length Register dependent upon if the data or the ECC bytes are being transferred.

BYTE COUNT HIGH REGISTER

BLOCK COUNT REGISTER

This register is used in read or write operations and is loaded with either 1 if the operation is to be a normal read or write command, the block size register for a read or write multiple command where the remaining sectors to be transferred is greater than the block size, or the Task File Count for a read or write multiple operation where the number of sectors remaining to be transferred is less than the block size.

READ WRITE STATES REGISTER

This register contains the current state of both the read and write state machines that are used to control any read or write operation to or from the host. The upper nibble contains the write states and the lower nibble contains the read states.
- bit 7—Wa
- bit 6—Wb
- bit 5—Wc
- bit 4—Wd
- bit 3—Rw
- bit 2—Rx
- bit 1—Ry
- bit 0—Rz

SECTORS AVAILABLE REGISTER

This register maintains a count of the number of sectors available to the Host on a read operation and the number of sectors available to the drive on a write operation. It may be loaded by the microprocessor. It is reset on an autowrite unless they are disabled.

SEGMENT SIZE REGISTER

This register contains the current size of the buffer segment. It is set by the microprocessor. It is used by the AT circuitry in the ASIC to determine if there is any addition room in the segment to place data.

BETWEEN SECTOR DELAY REGISTER

This register is used to control the amount of delay, in 400 ns increments, between sectors on multiple block read and write operations.

BUFFER REGISTERS

START POINTER LOW BYTE 1

This and the next register makes up the start pointer to the ram buffer for the first port of the microprocessor. It is reset to 00000 on the assertion of sector reset buffer 1. This registers upper address bits 12–15 are bounded by the buffer size register so that the start pointer will only contain valid addresses for the buffer size selected. This register is loaded into the microprocessor #1 address registers when the address pointer equals the microprocessor wrap pointer.

START POINTER HIGH BYTE 1

WRAP POINTER LOW BYTE 1

This and the next register makes up the wrap pointer to the ram buffer for the first port of the microprocessor. It is reset to 00000 on the assertion of sector reset buffer 1. This registers upper address bits 12–15 are bounded by the buffer size register so that the wrap pointer will only contain valid addresses for the buffer size selected. This register is loaded with the address that the programmer wants to cause a wrap condition on.

WRAP POINTER HIGH BYTE 1

ADDRESS POINTER LOW BYTE 1

This and the next register makes up the address pointer to the ram buffer for the first port of the microprocessor. This pointer is incremented to the next address upon each access to the ram. It is reset to 00000h on the assertion of sector reset buffer 1. This registers upper address bits 12–15 are bounded by the buffer size register so that the address pointer will only contain valid addresses for the buffer size selected. The microprocessor #1 start and wrap pointers can be used to select a wrap point inside the ram buffer. When the address pointer equals the wrap pointer the Start pointer is loaded for the next ram access.

ADDRESS POINTER HIGH BYTE 1

BUFFER CONTROL 1

This register contains the controls and status of port 1 of the microprocessor.

bit 7—U1PROG–(R)

Progress bit. Bit7=0 then the data in the data register is not valid yet. Bit7=1 Data is valid in the data register.

bit 2—ECC ENABLE

This bit when set will cause the data being read from this port to be clocked into the ecc generator. If the bit is clear data will not be clocked into the ecc generator.

bit 1—U1STRT (W/R)

Port activation bit. Bit 1=0. Any read or writes to the data register will cause no action to be taken. Bit 1=1. If bit 0=0 and the data register is written data will be transferred to the ram. If bit 0=1 then an immediate fetch of the first byte will be performed and there after a new byte will be fetched upon reading the data register.

bit 0—U1DIRW–/R (W/R)

The direction of the port. Bit 0=0 a write is performed to the ram. Bit 0=1 a read is performed.

DATA REGISTER

This is the data register for first microprocessor port. If microprocessor port #1 is active see register 47 then a read of this register will pass data read from the ram and start off another fetch operation to the ram. A write to this register will place the written data into the ram.

START POINTER LOW BYTE 2

This and the next register makes up the start pointer to the ram buffer for the first port of the microprocessor. It is reset to 00000 on the assertion of sector reset buffer 1. This registers upper address bits 12–15 are bounded by the buffer size register so that the start pointer will only contain valid addresses for the buffer size selected. This register is loaded into the microprocessor #1 address registers when the address pointer equals the microprocessor wrap pointer.

START POINTER HIGH BYTE 2

WRAP POINTER LOW BYTE 2

This and the next register makes up the wrap pointer to the ram buffer for the first port of the microprocessor. It is reset to 00000 on the assertion of sector reset buffer 1. This registers upper address bits 12–15 are bounded by the buffer size register so that the wrap pointer will only contain valid addresses for the buffer size selected. This register is loaded with the address that the programmer wants to cause a wrap condition on.

WRAP POINTER HIGH BYTE 2

ADDRESS POINTER LOW BYTE 2

This and the next register makes up the address pointer to the ram buffer for the first port of the microprocessor. This pointer is incremented to the next address upon each access to the ram. It is reset to 00000 on the assertion of sector reset buffer 1. This registers upper address bits 12–15 are bounded by the buffer size register so that the address pointer will only contain valid addresses for the buffer size selected. The microprocessor #1 start and wrap pointers can be used to select a wrap point inside the ram buffer. When the address pointer equals the wrap pointer the Start pointer is loaded for the next ram access.

ADDRESS POINTER HIGH BYTE 2

BUFFER CONTROL 2

This register contains the controls and status of port 2 of the microprocessor.

bit 7—U1PROG~(R)

Progress bit. Bit7=0 then the data in data register is not valid yet. Bit 7=1 Data is valid in data register.

bit 2—ECC ENABLE

This bit when set will cause the data being read from this port to be clocked into the ecc generator. If the bit is clear data will not be clocked into the ecc generator.

bit 1—U1STRT (W/R)

Port activation bit. Bit 1=0. Any read or writes to the data register will cause no action to be taken. Bit 1=1. If bit 0=0 and the data register is written data will be transferred to the ram. If bit 0=1 then an immediate fetch of the first byte will be performed and there after a new byte will be fetched upon reading the data register.

bit 0—U1DIRW~/R (W/R)

The direction of the port. Bit 0=0 a write is performed to the ram. Bit 0=1 a read is performed.

DATA REGISTER 2

This is the data register for second microprocessor port. If microprocessor port #2 is active then a read of this register will pass data read from the ram and start off another fetch operation to the ram. A write to this register will place the written data into the ram.

INTERFACE START POINTER LOW WORD

This and the next register makes up the start pointer to the ram buffer for the interface port. It is reset to 00000 on the assertion of sector reset buffer 1. This registers upper address bits 12–15 are bounded by the buffer size register so that the start pointer will only contain valid addresses for the buffer size selected. This register will be loaded into the interface address pointer upon a successful compare of the interface address pointer with the interface wrap pointer.

INTERFACE START POINTER HIGH WORD

INTERFACE WRAP POINTER LOW WORD

This and the next register makes up the wrap pointer to the ram buffer for the interface. It is reset to 00000 on the assertion of sector reset buffer 1. This registers upper address bits 12–15 are bounded by the buffer size register so that the wrap pointer will only contain valid addresses for the buffer size selected. This register is loaded with the address that the programmer wants to cause a wrap condition on.

INTERFACE WRAP POINTER HIGH WORD

INTERFACE ADDRESS POINTER LOW WORD

This and the next register makes up the address pointer to the ram buffer for the interface. This pointer is incremented to the next address upon each access to the ram. It is reset to 00000 on the assertion of sector reset buffer 1 or upon receiving an autowrite pulse. This registers upper address bits 12–15 are bounded by the buffer size register so that the address pointer will only contain valid addresses for the buffer size selected. The interface start and wrap pointers can be used to select a wrap point inside the ram buffer. When the address pointer equals the wrap pointer the Start pointer is loaded for the next ram access. This loading of the address pointer to 00000 by receiving an autowrite can be disabled by setting bit2 of the interface buffer control register.

INTERFACE ADDRESS POINTER HIGH WORD

INTERFACE BUFFER CONTROL

This register contains the controls and status of the interface buffer port.

Bit 7—IFPROG~(R)

Interface access to ram. Bit 7=0 when an access to the buffer ram is in progress. Bit 7=1 when interface port is idle.

Bit 6—FIFO FULL (R)

Bit 6=0 When there is room in the sector count FIFO for releases. Bit 6=1 When the sector count FIFO is full and can not accept any more entries.

Bit 5—FIFO EMPTY (R)

Bit 5=1 when the sector count FIFO is empty. Bit 5=0 when there is data in the sector count

15

FIFO

Bit 4—RESET FIFO

Bit 4=1 then the sector count FIFO is held in reset. Bit4=0 the sector count FIFO is free to be loaded.

Bit 2—AUTOWRITE–(W/R)

Autowrite load of start pointer. Bit2=0 will cause the start pointer to be loaded into the address pointer if an autowrite is received Bit2= 1 will inhibit the load of the start pointer into the address pointer on autowrites.

Bit 1—IFACT (R)

Interface port active. Bit 1=0 the interface port is not active. Bit 1=1 means the interface port is active.

Bit 0—IFDIRW~/R (R)

Interface direction. Bit 0=0 the data is flowing from the interface to the buffer. Bit 0= 1 the data is flowing from the buffer to the interface. This bit is only valid if Bit 1=1.

SECTOR COUNT LOW

This and the next register forms the sector count register port. The nine bits contain the number of bytes in the sector that is being released. This register is a port to a 16 word×10 bit FIFO. Sixteen sector counts can be stored up at a time. Bit 6 of register 56 returns the status of whether this FIFO is full. Both bytes must be written to load the 10-bit word in the FIFO. Bit 2 of the sector count high register is used to tell whether the sector that corresponds to this count is compressed or uncompressed. You set the bit to 1 for compressed data. Bits 11–15 are ignored but should be written as zero. The FIFO is reset and count purged if sector reset buffer 1 is asserted or if the interface deasserts its read_mode.

SECTOR COUNTER HIGH

READ SEQ START POINTER LOW WORD

This and the next register makes up the start pointer to the ram buffer for the read sequencer port. It is reset to 00000 on the assertion of sector reset buffer 1. This registers upper address bits 12–15 are bounded by the buffer size register so that the start pointer will only contain valid addresses for the buffer size selected. This register is loaded into the read sequencer address pointer Upon a successful compare of the read sequencer address pointer to the read sequencer wrap pointer.

READ SEQ START POINTER HIGH WORD

READ SEQ WRAP POINTER LOW WORD

This and the next register makes up the wrap pointer to the ram buffer for the read sequencer. It is reset to 00000 on the assertion of sector reset buffer 1. This registers upper address bits 12–15 are bounded by the buffer size register so that the wrap pointer will only contain valid addresses for the buffer size selected. This register is loaded with the address that the programmer wants to cause a wrap condition on.

READ SEQ WRAP POINTER HIGH WORD

READ SEQ ADDRESS POINTER LOW WORD

This and the next register makes up the address pointer to the ram buffer for the read sequencer port. This pointer is incremented to the next address upon each access to the ram. It is reset to 00000 on the assertion of sector reset buffer 1. This registers upper address bits 12–15 are bounded by the buffer size register so that the address pointer will only contain valid addresses for the buffer size selected. The read sequencers start and wrap pointers can be used to select a wrap point inside the ram buffer. When the address pointer equals the wrap pointer the Start pointer is loaded for the next ram access.

READ SEQ ADDRESS POINTER HIGH WORD

READ SEQ CONTROL

Bit 7—RSPROG~(R)

Read sequencers ram access. Bit 7=0 the read sequencer is accessing the ram. Bit 7=1 the read sequencer is idle.

Bit 1—RSACT~(R)

Read sequencer active. Bit1=0 means there is data in the read sequencer FIFO. Bit 1=1 means there is no data in the read sequencer FIFO.

Bit 0—RSDIRW~/R (R)

Read sequencer active. Bit 0 will always equal 0. Since the Read sequencer only writes to the buffer ram.

BUFFER CONTROL REGISTER

Bit 7—ADDRESS HIGH~/BCS1 (W/R)

Address or buffer chip select. Bit7=0 the address high will be sent to the buffer ram. Bit 7=1 then BCS1 will be sent to the buffer ram in place of the high address.

BUFFER SIZE REGISTER

This register selects the size ram buffer the chip will access.

01—8K BUFFER
03—16K BUFFER
07—32K BUFFER
0F—64K BUFFER

BUFFER COUNT REGISTER

This register contains the number of clock periods minus 1 that will be used to access the buffer ram. Only bits 0–3 are used.

SYSTEM OPERATION

The flash solid state drive operates under an operating system stored in ROM 28. The flash solid state drive performs various procedures under the joint control of the operating system and the various state machines.

Figure 2A:
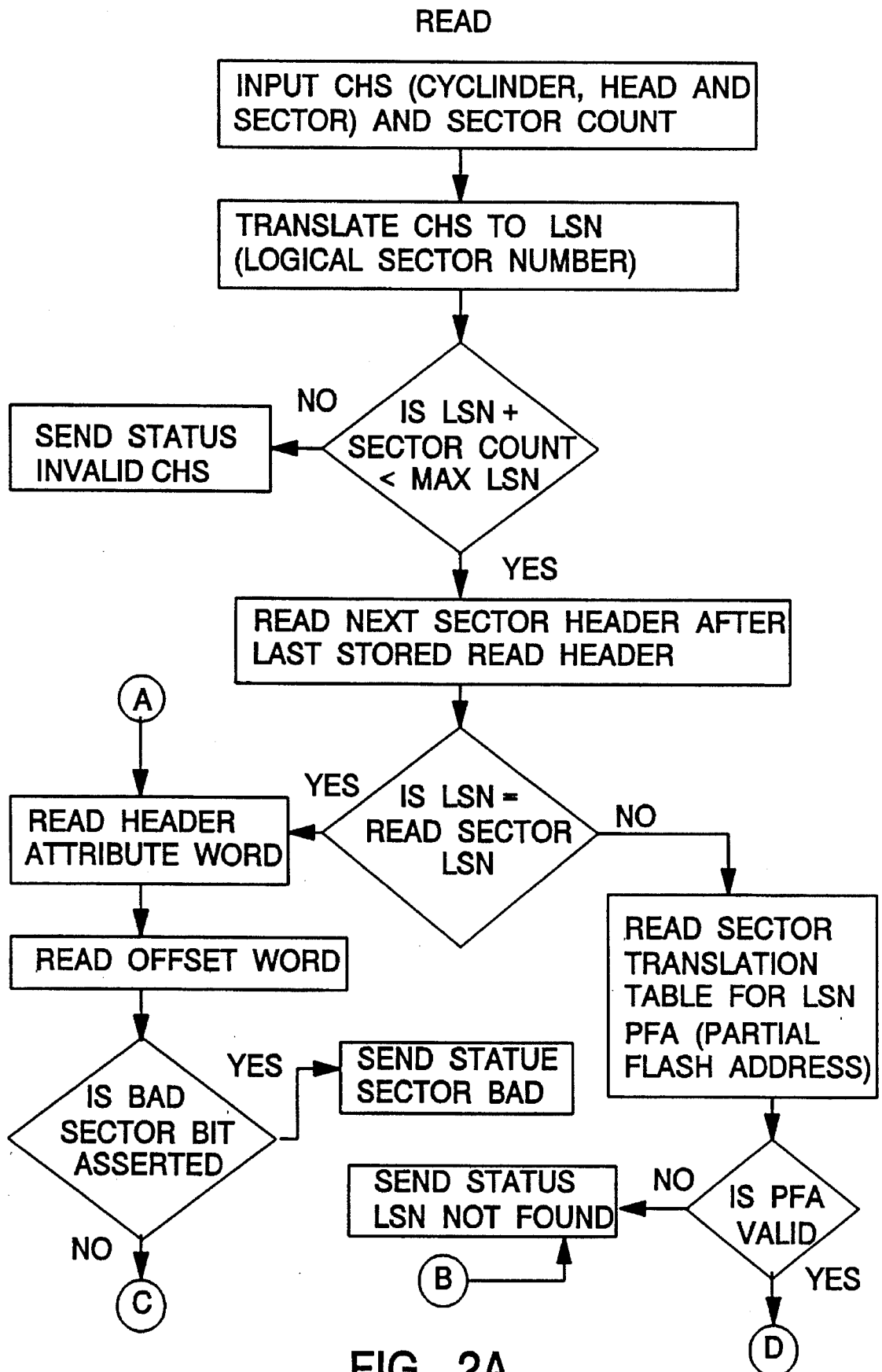
FIGS. 2A through 2C is a flow chart setting forth the operation of the flash solid state drive for a read operation.
Figure 2B:
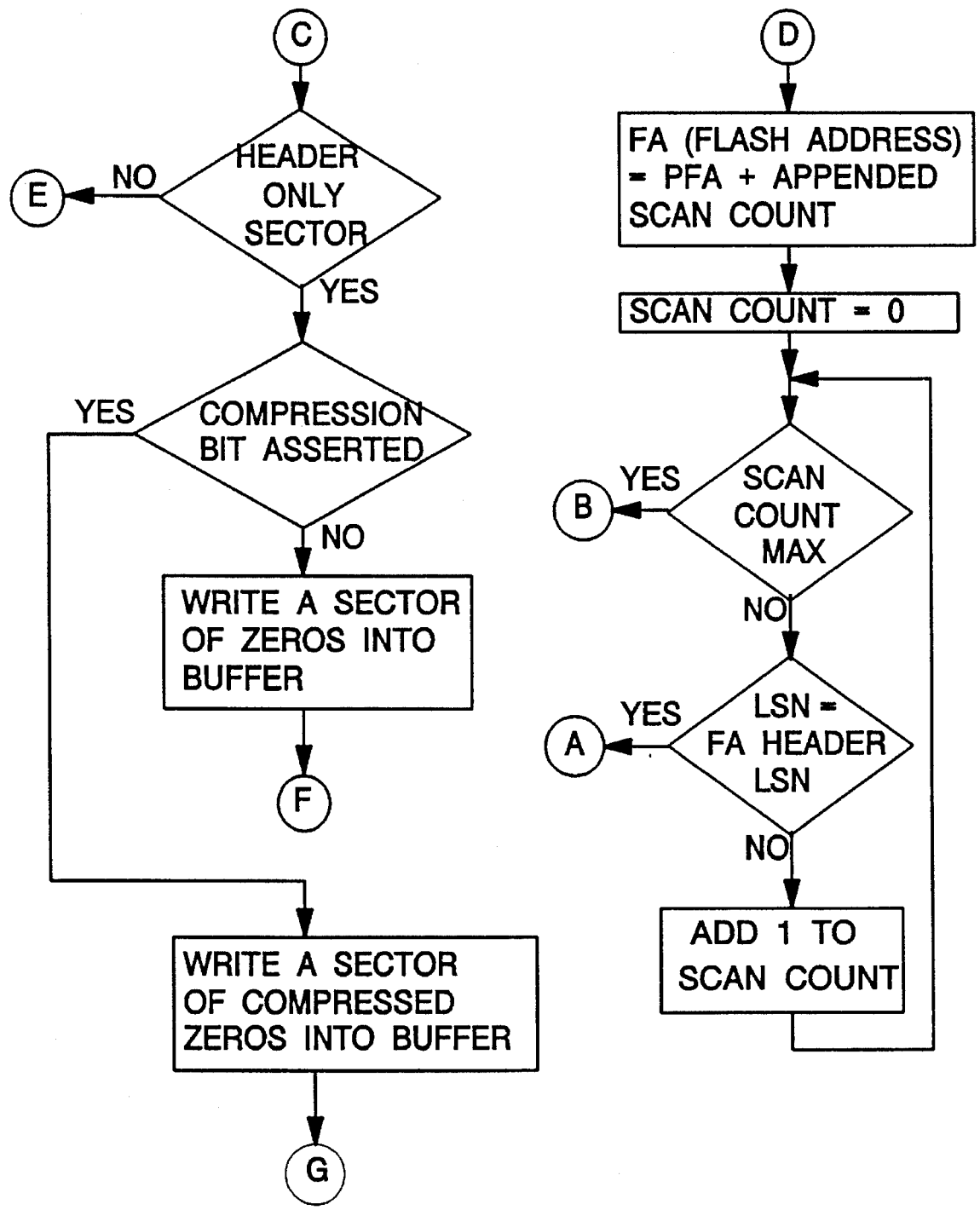
Figure 2C:
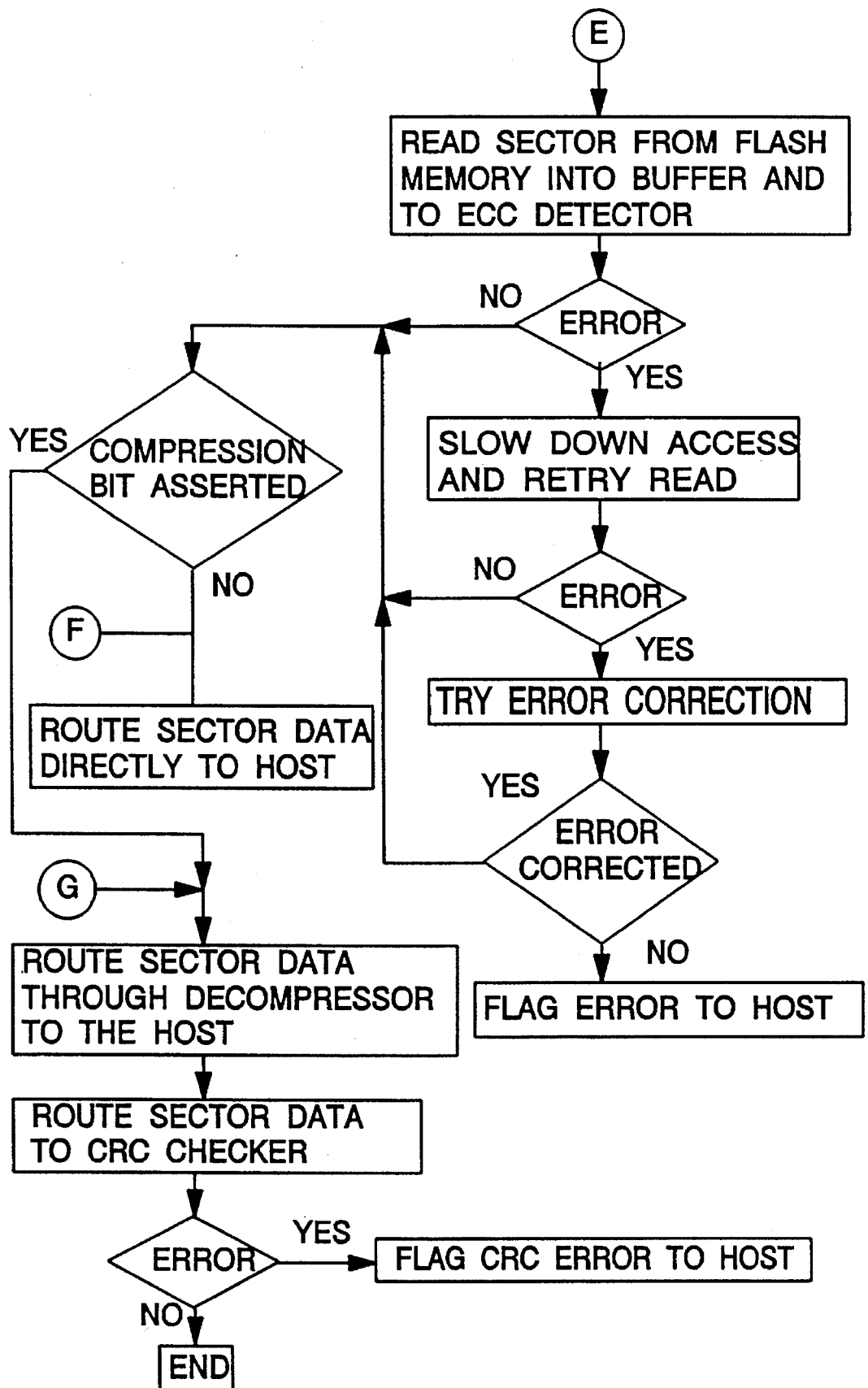

FIGS. 2A, 2B and 2C set forth the operation of the flash solid state drive for a read operation. The host sends to the flash solid state drive the read command, the sector count (the number of sectors to be read) and the cylinder, head and sector numbers CHS address. Upon receiving the CHS address, the flash solid state drive will translate that CHS address into a logical sector number (LSN). Each sector that would have existed on the magnetic disk drive will have an associated LSN in the flash solid state drive. Therefore for the emulation of any magnetic disk drive, the flash solid state drive will have a maximum number of LSNs.

A test is performed which adds the received sector count to the generated LSN and compares that summation to the maximum LSN for the flash solid state drive. If the resulting summation is greater than the maximum LSN or if the generated LSN was equal to zero, then the CHS address sent by the host was in error. Under this condition the flash solid state drive will send status of invalid CHS to the host.

Each LSN has a header stored in the flash memory which identifies and describes the sector to the drive. When the drive is first manufactured, a sector header for each LSN is written in the flash array. A header for each LSN will always exists in the flash array and it is possible for more than one header for a given LSN to exist in the flash array however only one such header will be mark clean and the remaining duplicate headers will be marked dirty or invalid. During operation, the drive will store the location of the header of the last LSN read.

If the CHS sent by the host was valid, the drive will read the next header in the flash array after the sector header who's location in the flash memory was stored during the last read operation. The stored sector header location allows the drive to calculate the flash array address for the next header. Effectively, if the LSN stored in the next header is the LSN for the LSN to be read then the drive has avoided the time necessary to seek a flash memory address for the LSN.

Therefore a test is done to compare the LSN generated for this read operation against the LSN read from the next sector header after the last stored sector header during the last read operation. If there is no match, the drive will go to a sector translation table and read a partial flash address PFA for the LSN. The sector translation tables has stored for each LSN a PFA. The low three order bits of the complete flash address FA are not included within the PFA thereby reducing the width of the sector translation table by one byte. In the preferred embodiment the largest PFA stored in the sector translation table is address FFFE. The PFA for the LSN is checked to determine if the PFA has a value of FFFF which would indicate an error condition. If an error condition is sensed, status is sent to the host indicating that the CHS address was not found.

If the PFA is valid, the drive will add the value of a scan count multiplied by the header size to the PFA to form the FA. A scan count register is maintained within the drive for generating the complete offset for the FA. At this time, the scan count register will be made to be equal to zero. The scan count is then determined by the drive and if the scan count has a value of 0 to 7, the drive will read the header located at the FA and determine if the LSN being sought is equal to the LSN stored in the sector header. If the LSN being sought is different than the LSN stored in the header, 1 is added to the scan count and the process is repeated. This loop will be repeated until either the scan count reaches a count of 8 which will cause the drive to send status of CHS not found to the host or a match has been obtained between the LSN being sought and the LSN stored in the header being read at the flash address. When either the condition that the LSN being sought was equal to the LSN stored in the next sector header after the last header stored from the previous read operation or the LSN in the header of the sector addressed in the flash memory, the drive will read the header. The header includes an attribute word and an offset word. The attribute word contains a bit that is set if the host has indicated that the sector was bad. If the bad sector bit is asserted, the drive will send status to the host indicating that the sector is marked bad. The offset word indicates the location of the data stored for that sector. If the attribute word indicates zero bytes of data, the drive will determine from the attribute word if the attribute word's compression bit is asserted. The compression bit indicates whether or not the sector data was compressed during the writing operation for storing that sector. If the compression bit was asserted, the drive will write a sector of compressed zero bytes into the buffer. If the compression bit was not asserted, the drive will write a sector, 512 bytes, of zeroes into the buffer. Since no data was stored within the flash memory, the drive generates the proper bytes of data to be stored into the buffer.

Where the attribute word indicates that data is stored after the header, the drive will read as data words from the flash memory the sector data, the CRC data, if any, and the ECC data. The offset word indicates the address at which the data is stored. As previously described, the flash memory is so arranged as to have the flash chips paired together such that 16 bits or two bytes of data may be read from the flash memory at a time. The offset provides the address at which the data starts in both of the flash chips. Data is stored on the flash chips starting at the address indicated by the offset and subsequent data words are read by incrementing the flash address for the first data word until all the data words are read for the sector. The data words are converted into two sequential bytes of data by the read sequencer 17 and each byte of sector data is read through multiplexer 12 into buffer 11. The bytes are routed through the ECC detector 15 and if an error is detected, the drive will slow down the access time to allow more settling time for the flash memory and retry reading the sector. If the retry was not successful, error correction techniques are then attempted to correct the error. If the error was not corrected, a flag is set indicating the error for the host.

If there was no error or if an error is corrected, then the drive will again determine whether the compression bit in the header was asserted. If the compression bit was not asserted, the buffer will contain 512 bytes of data and 4 bytes of ECC data. The drive will then route the uncompressed sector data through the data multiplexer 12, FIFO 14, selector 18 and interface control 19 to the host. If the compression data bit was asserted, the buffer will contain either the compressed data for the sector or a compressed sector of zeros, a CRC byte and 8 bytes of ECC data. The drive will route the compressed data from buffer 11 through data multiplexer 12, FIFO 14 and selector 18 to decompressor 24. Decompressor 24 decompresses the data and provides 512 bytes of data to interface control 19 to be transferred to the host. The output of the decompressor 24 is also sent through the CRC checker 23 which will determine if the decompressed data contains an error. If an error is detected by the CRC checker, a flag CRC error is posted to the host to indicate that the sector data just received by the host contains an error. The use of the CRC checker allows the drive to identify an error most likely occurring during either the compression or decompression of the sector data.

Figure 3A:
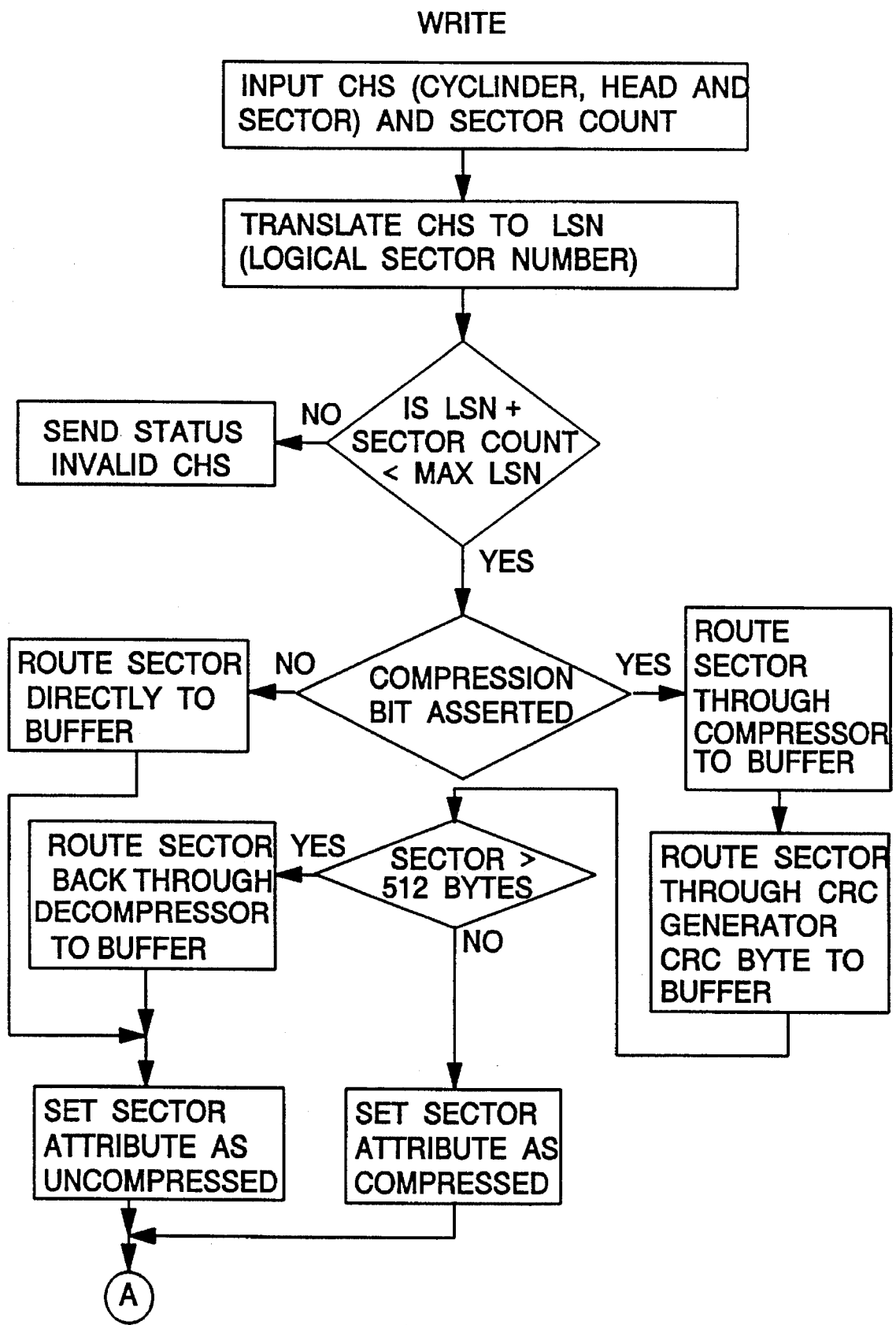
FIGS. 3A through 3C is a flow chart setting forth the operation of the flash solid state drive for a write operation.
Figure 3B:
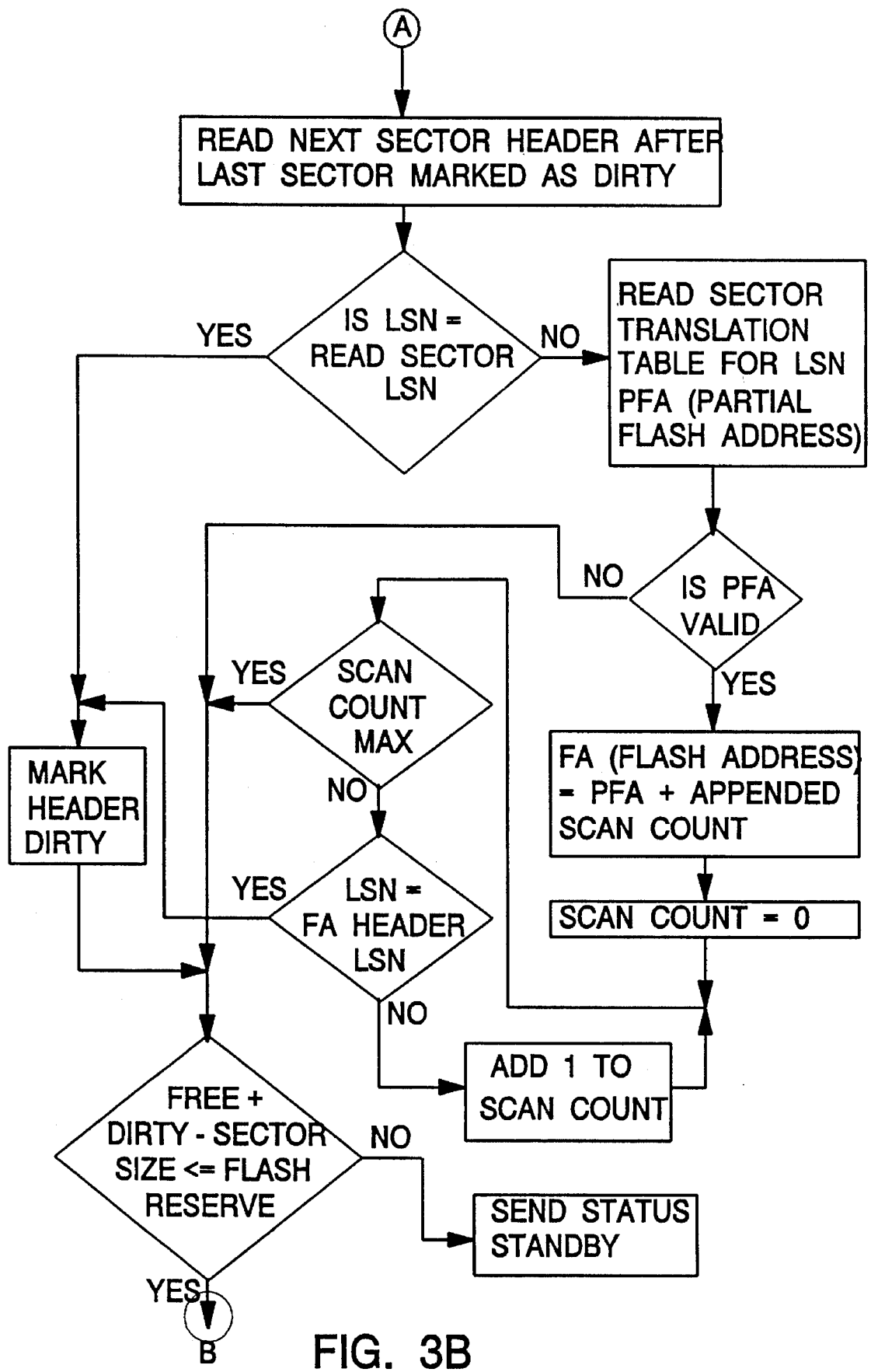
Figure 3C:
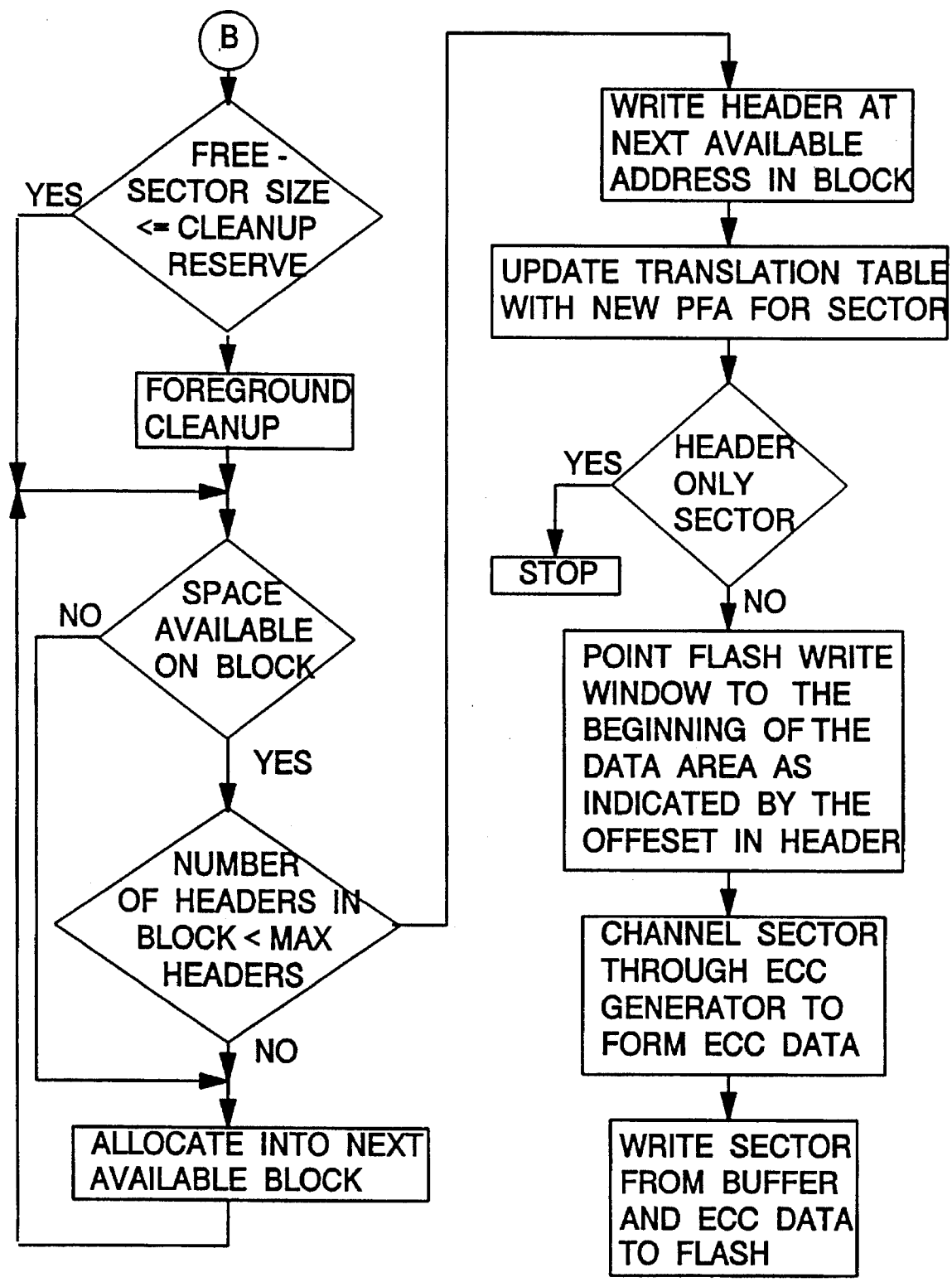

FIGS. 3A–3C describe the flash solid state drive operation for a write operation. The host issues a write instruction, the CHS address and a sector count of the number of sectors to be written. Again, the drive will translate the CHS address into a LSN. The LSN is then tested to see if the LSN is a valid LSN and, if not, sends an ID not found status to the host. The drive contains a register which has a bit assigned to it for indicating whether the data is to be compressed during a write instruction or has been compressed for a read instruction. The host processor can set this bit for a write operation and the drive sets the bit during a read operation. If the compression bit is not asserted, the 512 bytes are routed through interface control 19, selector 18, FIFO 14 and data multiplexer 12 into buffer 11. No CRC data is generated for this sector since it was not passed through compressor 20.

Whenever a sector is written into the flash memory, a new header is written for that sector. Therefore the compression bit in the attribute word of the sector header is set to indicate the sector data is uncompressed. If the compression bit is asserted, the incoming sector data is routed through interface control 19 to compressor 20 and CRC generator 22. Compressor 20 is a LEMPEL/ZIV data compressor. The compressor operates on 512 byte sectors and achieves an average compression ratio of approximately 1.6 to 1. The uncompressed data is passed through CRC generator 22 to form one byte of CRC data which is appended to the compressed data bytes from compressor 20. After compression is completed by compressor 20, a test is made as to the number bytes generated by the compression operation. In some circumstances it is possible for the number of compressed data bytes to be greater than the 512 bytes of original data. If the number of compressed bytes is equal to or less than 512 bytes, the drive will route the compressed data and the appended CRC byte through selector 18, FIFO 14, data multiplexer 12 into buffer 11. Buffer 11 is segmented and has allocated areas for storing data received for storage in the flash memory or for storing data to be sent to the host and for storing background data.

If the compression results in greater than 512 bytes of compressed data, the drive will re-route the compressed data from buffer 11 through data multiplexer 12, FIFO 14 and selector 18 to decompressor 24 such that the data is decompressed back to its original 512 bytes and stored in RAM 31. The sector data is then routed as uncompressed data from RAM 31 through selector 18, FIFO 14, data multiplexer 12 into buffer 11.

If the compression results in an unsuccessful compression, the compression bit in the attribute word is set to indicate uncompressed. If the compression resulted in a successful compression, the compression bit in the attribute word is set to indicate compression.

Since a new sector header is written for each writing of a sector and a sector header always exists within the flash memory for each logical sector number, the active or old sector header in the flash memory must be marked as invalid or dirty. In a similar fashion to the read operation, the last header associated with the sector marked dirty from the last write operation has been saved by the drive. The drive uses that header address as a pointer to the address for the next sector header in the flash array following the sector that was marked dirty during the last write operation. The drive reads the sector header and determines if the LSN in that header equals the LSN associated with the CHS address issued by the host. If the LSNs are the same, the drive will mark that header as dirty or invalid. A header is marked dirty or invalid by making the LSN stored in the header equal to 0000 which is an illegal LSN. If the LSN being sought is not equal to the LSN stored in the header, the drive reads the sector translation table to obtain a PFA for the LSN, in a similar fashion as was done for the read operation. Again, the PFA is tested as to whether it is valid or not and, if it is valid, the scan count is appended to the PFA to form the complete FA. Again, the scan count is set to zero and the drive then goes through the same loop of three steps, that is testing if the scan count is equal to 8, comparing the LSN being sought against the LSN in the header at the flash address and, finally, to add 1 to the scan count. If a match of the LSNs is found, the header at that FA is marked dirty.

If the PFA was invalid or the scan count reached a count of 8 indicating that the FA was invalid, the drive will ignore this situation and proceed with the write operation. This condition can be ignored because if the same LSN was issued during a read instruction, the read instruction would find the same invalid addresses and would return an ID not found status to the host. Further, since the write operation generates a new header which will update the sector translation table, there is no adverse affect by not finding the previous header for the LSN.

At this time either the old header has been marked invalid or the old header has not been found, the drive will next make a calculation of the amount of space available on the flash array for storing data. The drive maintains a register indicating the amount of free sectors and the amount of dirty sectors. The drive adds the number of free sectors to the number of dirty sectors and subtracts the number of sectors to be written during this write operation. The results is compared against a flash reserve set by the drive which is the number of sectors that have been reserved by the drive which are not available for writing data into. If the result is greater than the flash reserve, then standby status is sent to the host, indicating that the write operation cannot be performed.

If the result is equal to or less than the flash reserve, the drive performs the next test by subtracting the sector size from the number of free sectors and comparing the results with the cleanup reserve. The clean-up reserve is an amount of sectors that are predetermined by the drive as necessary to perform clean-up operations. If the result is greater than the clean-up reserve, the drive goes into a foreground clean-up operation. Each of the flash chips contains one megabyte of data and the block area that can be erased is 64 kilobytes of data. Therefore each block of data may contain a plurality of sectors stored within the block. The drive then reviews each block on each chip pair within the flash memory to determine if any block contains only dirty sectors. If such a block is found, that block is erased making that block available as free space.

In some situations the drive will find that a large proportion of a block is dirty and a small portion of the block has stored sector data. The drive will then go into a mode where it will read those sectors into the buffer and then restore those sectors into the clean-up reserve area, thereby allowing the block to then be erased and provide more free space in the array. The reading and writing during a clean-up operation follows the same procedure as the reading and writing of read/write command from the host.

The drive will next check the block to which it last read a header during the write operation to determine whether that block has space available for writing the present sector. If space is not available, the drive will move to the next block on the chip and determine if space is available on that block. Once a block is found with space available for writing the sector, a test is performed to determine if addition of this header would surpass the maximum number of headers allowed for a block. If the maximum number of headers would be surpassed, the drive will move on to the next block until a block is found that has both space available and room for another header.

Once an available block has been located, the header for the new sector is written at the next available address in the block. At this time the drive will write the flash address less the three low order bits into the sector translation table as the PFA for the LSN.

The drive will then check the attribute word for the new header to determine whether there is any data to be actually stored for the sector. If no data is to be written, the write operation is completed. If there is data to be written, the drive will point the write circuitry on the proper flash chip pair to the address to begin writing the sector data. As previously discussed in the read operation, data is written with the first data word being written at the offset flash addresses and all subsequent data words written at incremented addresses until all the data words have been written into the flash memory. Again data is written in a form of data words where data words contains two bytes of data. Effectively, all even bytes of data are stored in one flash chip and all odd bytes of data for the sector are stored in the other flash chip. During an erase operation of a block, a block in both of the flash chips will be erased.

The drive is now ready for the actual writing of data into the flash memory. The sector data stored in buffer 11 is first routed through multiplexer 12 to microprocessor 30 and to ECC generator 26. ECC generator generates 4 bytes of ECC data which is appended to the end of the sector data to be stored. Microprocessor 30 receives the byte by byte data from buffer 11 and provides data words to flash controller 21 such that flash controller 21 may write 16 bits in parallel into the flash memory. Microprocessor 30 will provide data words until all the data words for the sector data, the CRC data,if any, and the ECC data have been read into the flash memory.

During a write operation the sectors associated with a write command are attempted to be written sequentially into the flash array. However, this is not a requirement as the flash solid state drive maintains the location of each sector's location within the drive. Further, during a foreground operation, sectors may be moved from their original positions to other positions within the memory thereby destroying the sequentiality of location from which the sectors were originally written in the flash memory. However, the location of each sector is updated in the sector translation table whenever a sector is written, either in response to a write command from the host or during a foreground clean-up operation.

When power is brought up to the flash solid state drive, the sector translation table must be recreated from the header information stored in the flash memory. ROM 28 is composed of flash chips and, therefore, is capable of being written into. A table of bad blocks is stored in ROM 28. Seldom does a block within the flash array go bad and, therefore, the time necessary to write this data into ROM 28 is not prohibitive. A block is deemed bad if two or more unrecoverable errors have been detected during a read operation from two or more unique locations in that block.

Figure 4A:
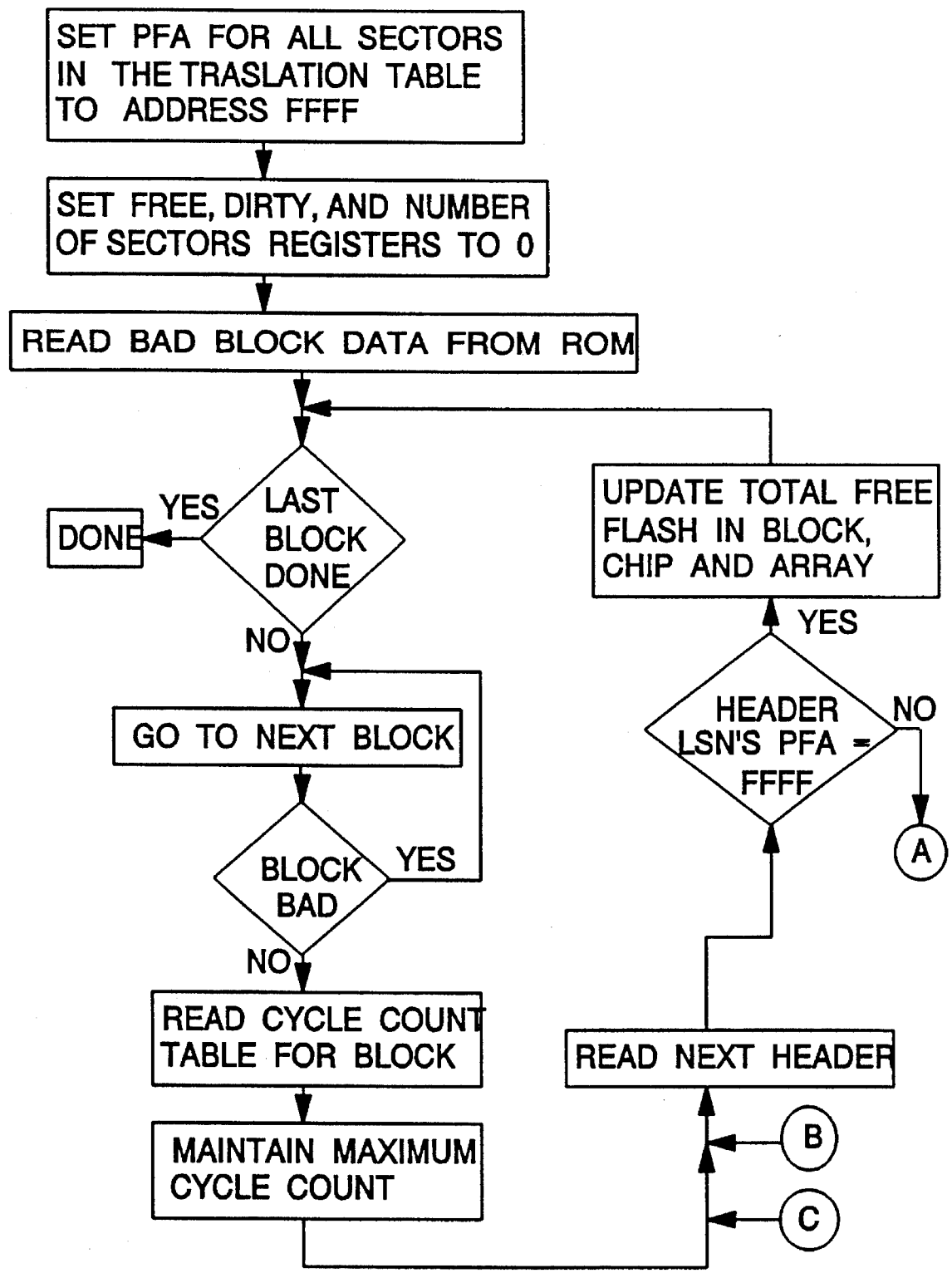
FIGS. 4A and 4B is a flow chart setting forth the operation of the flash solid state drive to initialize the sector translation table during the power up sequence.
Figure 4B:
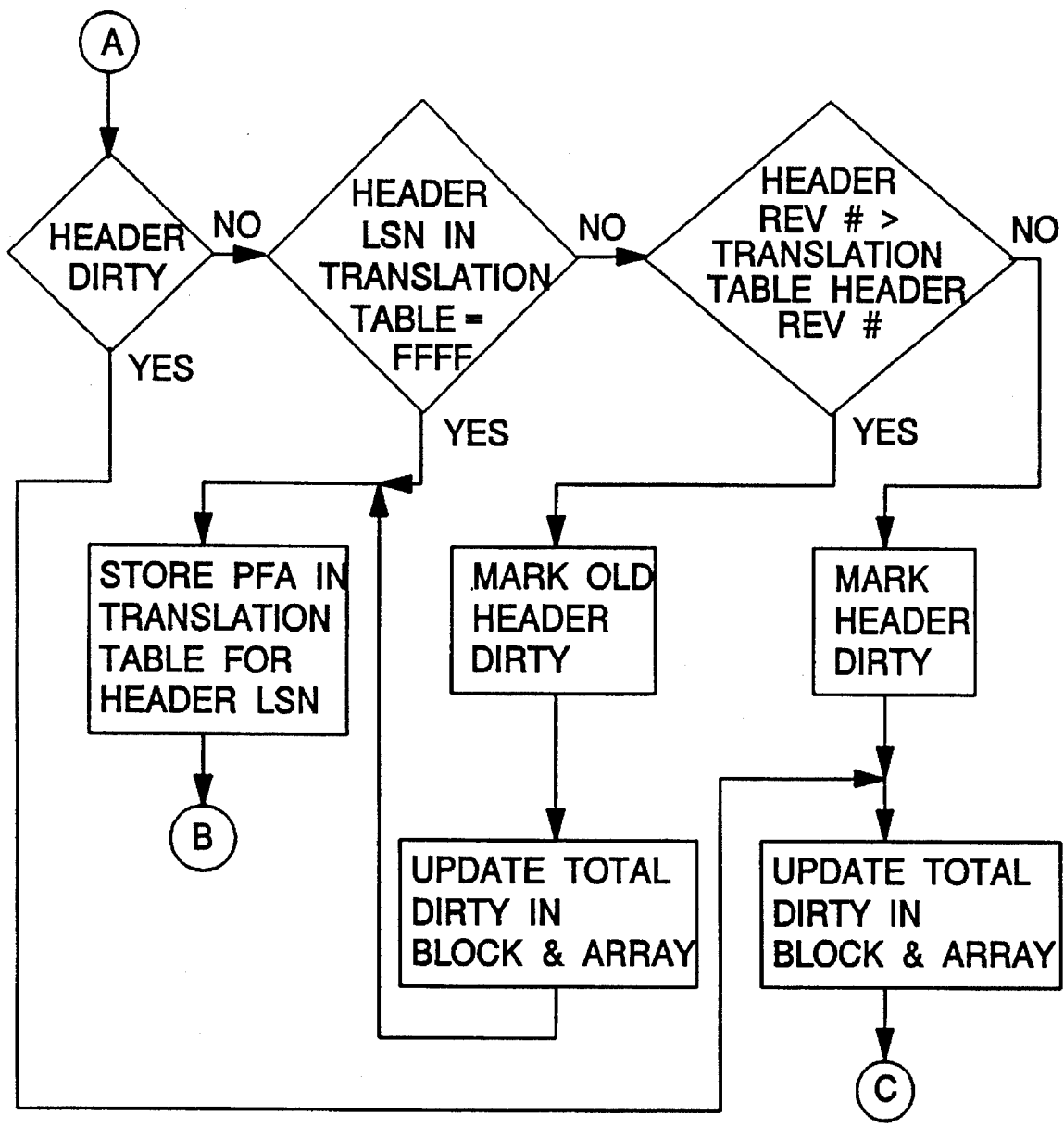

FIGS. 4A and 4B show the procedure enacted by the flash solid state drive to reconstruct the sector translation table during the power-up sequence. First, the PFA for each LSN is set to the illegal address of FFFF. Next, the registers containing the number of free sectors,dirty sectors and total number of sectors are reset to zero. Finally, the bad block data is read from ROM 28 and stored in RAM 29.

A test is done to establish if the last block in the flash array has been processed. If the last block has been processed, the initiation procedure is done. If the last block has not been processed, the drive will go to the next block in the flash array. In the beginning, the drive will go to the first block in the first chip pair and sequentially go through the blocks on a given chip pair and then through all chip pairs until all blocks on all chip pairs have been processed. When arriving at a block the block table is checked to determine if the block is bad. If the block is bad, the block is not processed and the drive will go to the next block. Arriving at a good block the drive will read from the block the cycle count for that block.

Each block has stored within a designated area in the block a cycle count indicating the number of times the block has been erased. The cycle count is read and noted by the drive for that block of memory. The cycle count for the block being processed is compared with the maximum cycle count presently stored in the maximum cycle counter register. If the cycle count for this block is greater than the maximum cycle count in the register, the cycle count for this block is stored and becomes the maximum cycle count. The maximum and individual cycle counts are used by the drive in determining the wear profile of the flash memory. Since flash chips have a lifetime defined by the number of times the blocks on the chip are erased, it is desirable to attempt to maintain the cycle count across the flash memory as evenly as possible such that the flash chips in the flash memory age at the same rate. The drive can use the knowledge of the maximum cycle count and the cycle count for a given block in determining whether or not that block should be erased during a clean-up process as described for the write operation. By not erasing the block, the block will remain in its present erase age until other portions of the flash memory obtain approximately the same age.

Once arriving at a block the process will read the next header in the block. The header first read will be the first header in each block as that block is processed. The header LSN is read and that LSN's location is read from the sector translation table to determine if that LSN's PFA is equal to the invalid address of FFFF. A header is maintained by the drive at the end of the space allocated for header data to be written into the flash memory. This last header for has a LSN equal to FFFF. Therefore, after the header is read, the header LSN is checked for the value of FFFF and, if the condition is met, the drive knows that all headers have been processed. If the header LSN is not equal to FFFF then the drive will go on and process the header in that block.

Next, the header for the sector is checked to see if the sector is dirty, that is, does the sector contain valid data. The sector is noted to be dirty by having a LSN equal to 0000. If the sector is dirty, the dirty block register and dirty array register are updated and the drive will read the next header. If the header is not dirty, the drive will read the logical sector number in the header and then reference that LSN in the sector translation table to determine if the PFA associated with that LSN is FFFF. If the PFA is not FFFF, the drive knows that it had processed the same LSN prior to processing this header.

The header attribute word has a field which indicates the revision number which is generated by the drive whenever a LSN is written such that the highest revision number represent the LSN having the most recent and therefore valid data for that LSN. The drive will read the header for the PFA in the sector translation table for the LSN. The drive then compares the revision number in the retrieved or old header for that LSN with the revision number for the presently being processed LSN. If the presently processed header's revision number is greater than the old header's revision number, the old header's is marked dirty by making a old header's LSN equal to 0000. The drive will then update the dirty block register and dirty array register. Next, the drive will modify the sector translation table to reflect the PFA of the header presently being processed for the LSN stored the header presently being processed. The drive will then go on to process the next header.

If the header revision number for the presently processed sector is less than the revision number in the old header, then the presently processed header's LSN is marked dirty by making the LSN equal to 0000. In practice this occasion should not arise because low revision sectors should have been marked dirty when the latest revision was written. This process is done to make sure that the PFA associated with a LSN contains the most recent data that was stored in the flash memory for that LSN. Once again the total dirty block register and array register are updated and the drive then proceeds to the next header for processing.

When the last header has been processed in that block, the drive will update the total amount of free flash in the block, chip and array registers. When the last block has been processed, the sector translation table has been rebuilt and the total amount of free flash for each block, chip and the memory is stored in a free flash block registers, free flash chip registers and a free flash memory register. At the end of the initialization the drive will therefore have reconstructed the sector translation table and will know the free flash available for processing on each chip, for each block on each chip and for the total memory.

The foregoing description of the system architecture and the system operation would allow a drive designer, skilled in the art, to construct the flash solid state drive and to write an operating system for operating that constructed flash solid state drive in the manner as heretofore set forth above. It is understood that the designer of the operating system may wish to vary the steps in the procedure as set forth in the discussion of the operation of the system. Further, the designer may wish to design the system architecture to take advantages of the specification which the designer is setting for his own flash solid state drive. Such variations that could be to include would be where the operating system stored in ROM performs the procedures that are carried out by the state machines or where additional state machines carry out other portions of the operating system that where stored in ROM.

From the foregoing discussion a flash solid state drive has been described which emulates a magnetic disk drive. Specifically, the drive described emulates a 40 megabyte magnetic disk drive. The flash memory array will store 30 megabytes of compressed data which is equivalent to approximately 45 megabytes of uncompressed data. The flash drive described employs various length sectors for enhancing data storage, the simultaneous reading and writing of two bytes of information into and out of the flash memory to increase the speed of the flash solid state drive and the dynamic storage of sectors in the flash array in accordance with availability of within the flash memory.

The flash solid state drive is transparent to the host and can be used directly in place of a magnetic disk drive having the same storage capacity, or less. Further, the flash array may be altered in size to contain more or less flash chips, thereby increasing or decreasing the capacity of long term memory within the flash solid state drive. The described flash solid state drive is plug compatible with the magnetic disk drive which it emulates and does not require any reprogramming of the host system employing the flash solid state drive.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. A solid state drive having a solid state memory connected to a host for receiving and sending fixed length data blocks to and from the host, said solid state drive comprising:

control means for converting said fixed length data blocks received from the host into a variable length data blocks to be stored in said solid state memory as data blocks of nonuniform length where said control means comprises:

compression means for compressing said fixed length data blocks received from the host to form a compressed data block of nonuniform length; and storing means for storing said compressed data in said solid state memory as data blocks of nonuniform length and for retrieving data blocks of nonuniform length from said solid state memory.

2. The solid state drive of claim 1 wherein said control means comprises:

decompression means for decompressing a said compressed data block read from said solid state memory to recover said received data block as received from the host.

3. The solid state drive of claim 1 wherein said control means further comprises:

selection means for controlling whether said fixed length data blocks received from the host is to be stored as a fixed length data block or as a variable length data block in said solid state memory; and marking means for generating indicia to be stored with said data block indicating whether that said data block was stored as a fixed length or variable length data block.

4. The solid state drive of claim 1 wherein said solid state memory further comprises:

translation means for translating said drive address into a block number for identifying a data block within said solid state drive.

5. A flash solid state drive, having a flash solid state memory compatible with ATA/IDE Interface standards to be connected to a host for storing or retrieving sectors of data, where each sector contains 512 bytes of data, each sector is addressed by a cylinder, head and sector number CHS and said host provides for a read operation the number of sectors to be retrieved, the CHS for each sector to be retrieved and for a write operation the number of sectors to be stored, the CHS for each sector to be stored and the data for the sectors to be stored, said solid state memory having stored therein a header for each CHS address that can be issued by said host said header having indicia identifying the data block and indicating where the data for said data block is stored in said solid state memory, said flash solid state device comprising:

translation means for translating said CHS address into a logic sector number LSN for identifying sectors in said flash solid state drive; and control means for converting said fixed length sectors received from the host into variable length sectors to be stored in said flash solid state memory as sectors of nonuniform length.

6. The flash solid state drive of claim 5 wherein said control means further comprises:

compression means for compressing said fixed length sector received from the host to form a compressed sector of a non defined length;

storage means for storing said compressed sector being stored in said flash solid state memory as compressed sectors of nonuniform length and for retrieving compressed data sectors of nonuniform length from said flash solid state memory; and decompression means for decompressing a said compressed sector read from said flash solid state memory to recover said received sector from said compressed sector.

7. The flash solid state drive of claim 5 wherein said control means further comprises:

selection means for controlling whether said fixed length sector received from the host is to be stored as a fixed length sector or as a variable length sector in said flash solid state memory; and marking means for generating indicia to be stored with each said sector indicating whether said sector was stored as a fixed length or variable length sector.

8. The solid state drive of claim 5 further comprising:

ECC generating means for generating ECC data for each fixed and variable length sector prior to said sector being stored in said flash solid state memory, said ECC data being stored with said sector generating said ECC data in said flash solid state memory;

ECC detection means for determining if a sector read from said flash solid state memory was in error; and error correcting means for correcting the error detected by said ECC detection.

9. The flash solid state drive of claim 6 further comprising:

size detector for generating a first signal if the number of bytes of compressed data for a sector after compression by said compressor means is greater than 512 bytes of data;

second control means in response to said first signal for routing said compressed sector giving rise to said first signal through said decompression means to recover the uncompressed sector such that said uncompressed sector will be stored as a fixed length sector in said flash solid state memory.

\* \* \* \* \*

UNITED STATES PATENT AND TRADEMARK OFFICE
CERTIFICATE OF CORRECTION

PATENT NO. : 5,459,850

DATED : October 17, 1995

INVENTOR(S) : Donald W. Clay et al.

Page 1 of 2

It is certified that error appears in the above-indentified patent and that said Letters Patent is hereby corrected as shown below:

On title page, item [54],
In the Title, "LENTH" should be --LENGTH--.
Column 1, line 3, "LENTH" should be --LENGTH--.
Column 4, line 2, before "where" insert --51--; line 37, "act" should be --acts--; line 54, change "as" to --in--.
Column 5, line 15, "varies" should be --various--; line 17, delete "for".
Column 6, line 45, before "7" insert --bit--; line 59, after "ECC" (second occurrence) delete "is".
Column 8, lines 25 and 29, "35" should be --40--.
Column 10, line 22, "DMAtransfers" should be --DMA transfers--; line 23, "DMARequest" should be --DMA Request--.
Column 11, line 45, "addition" should be --additional--; line 63, "registers" should be --register's--.
Column 12, lines 9 and 25, "registers" should be --register's--. line 64, delete "see register 47".
Column 13, lines 6, 20 and 35, "registers" should be --register's--.
Column 14, lines 12, 25 and 39, "registers" should be --register's--; line 67, after "count" insert --FIFO--..
Column 15, line 1, delete "FIFO"; line 31, change "56" to --24--; lines 48 and 62, "registers" should be --register's--; line 52, "Upon" should be --upon--.

UNITED STATES PATENT AND TRADEMARK OFFICE
CERTIFICATE OF CORRECTION

PATENT NO. : 5,459,850
DATED : October 17, 1995
INVENTOR(S) : Donald W. Clay et al.

It is certified that error appears in the above-indentified patent and that said Letters Patent is hereby corrected as shown below:

Column 16, line 9, "registers" should be --register's--; line 64, "CHS address" should be --(CHS address)--.

Signed and Sealed this

Twenty-fifth Day of February, 1997

BRUCE LEHMAN

Attest:

Attesting Officer

Commissioner of Patents and Trademarks